United States Patent [19]

Maron

[11] Patent Number: 5,024,522
[45] Date of Patent: Jun. 18, 1991

[54] RETICLE MASKING APPARATUS FOR A CAMERA AND METHOD

[76] Inventor: Stanislav Maron, 7801 N. 54th St., Paradise Valley, Ariz. 85253

[21] Appl. No.: 542,260

[22] Filed: Jun. 21, 1990

[51] Int. Cl.$^5$ .......................... A63J 5/00; G03B 23/02
[52] U.S. Cl. .......................................... 352/89; 352/72
[58] Field of Search .................. 352/89, 46, 47, 72

[56] References Cited

U.S. PATENT DOCUMENTS

| | | | |
|---|---|---|---|
| 1,944,031 | 1/1934 | Laug | 88/17 |
| 2,506,649 | 5/1950 | Reeves | 88/13.4 |
| 2,733,633 | 2/1956 | Wottring | 88/18.4 |
| 3,303,981 | 2/1967 | Wiese . | |
| 3,428,395 | 2/1966 | Mitchell | 352/194 |
| 3,625,406 | 12/1971 | Campbell | 226/52 |
| 3,776,626 | 12/1973 | Lewis | 352/194 |
| 3,914,035 | 10/1975 | Satterfield | 352/191 |
| 3,997,251 | 12/1976 | Mitchell | 352/72 |
| 4,331,396 | 5/1982 | Nyman | 352/85 |
| 4,360,254 | 11/1982 | Nyman et al. | 352/166 |
| 4,410,254 | 10/1983 | Niemuth et al. | 354/203 |
| 4,522,476 | 6/1985 | Renold . | |
| 4,534,630 | 8/1985 | Williamson | 352/194 |
| 4,726,674 | 2/1988 | Smith et al. | 354/203 |
| 4,835,555 | 5/1989 | Maxwell | 352/194 |

Primary Examiner—Monroe H. Hayes
Attorney, Agent, or Firm—Cahill, Sutton & Thomas

[57] ABSTRACT

A sliding mirror mechanism is positionable in a first position to operatively engage a registration device to permit reticle masking for multi image photographs and in a second position to operatively cooperate with a rotary shutter to expose a strip of film to make the photograph. An interchangeable flip mirror shutter mechanism, operatively combinable with the registration device, can be substituted for the sliding mirror mechanism. In a first position, the mirror of the flip mirror shutter mechanism cooperates with the registration device to compose the image to be photographed and in a second position exposes the strip of film to make the photograph. Each of a pair of film boxes is keyed to the camera and removably retained by a pivoting lever. An independent pivotally mounted direct drive motor associated with each film box selectively urges rotation of a reel attached driven wheel with a drive wheel.

30 Claims, 6 Drawing Sheets

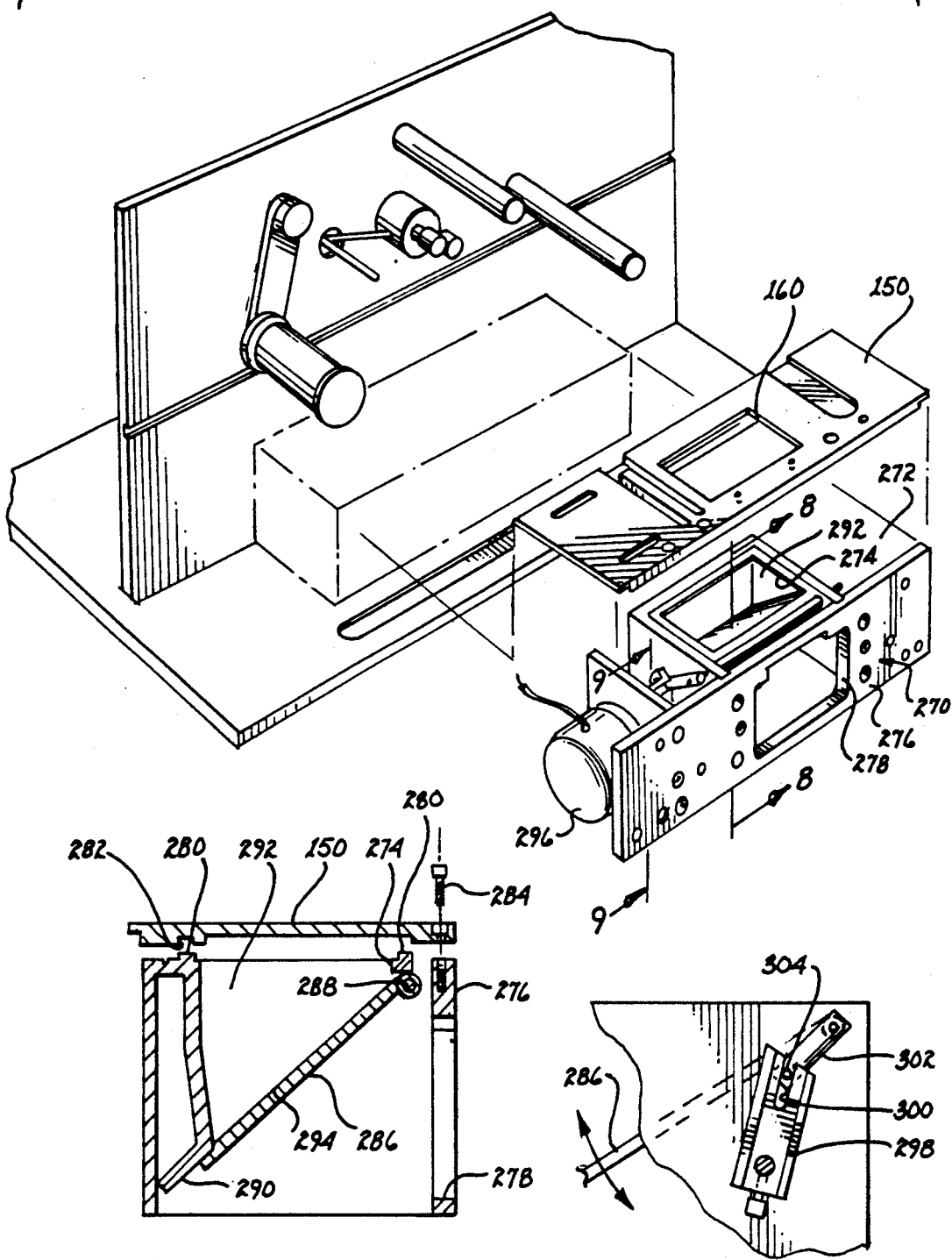

RETICLE MASKING APPARATUS FOR A CAMERA AND METHOD

CROSS REFERENCE TO RELATED APPLICATIONS

This application describes subject matter related to the invention disclosed in pending applications entitled "FILM REGISTRATION APPARATUS AND SHUTTER FOR A CAMERA AND METHOD", Ser. No. 260,450, filed Oct. 20, 1988, and "FILM REGISTRATION APPARATUS FOR A CAMERA AND METHOD", Ser. No. 542,259, filed concurrently herewith on June 21, 1990.

BACKGROUND OF THE INVENTION

1. Field of the Invention

The present invention relates to film transport mechanisms for cameras and, more particularly, to sliding mirror mechanisms, flip mirror shutters and film boxes with disengageable drives.

2. Description of the Prior Art

A shutter for multi exposure images generally includes a rotatably driven segmented disk having multiple journals for support, which structure, in combination with reticle masking apparatus, is an impediment to the minimum size of the camera casing or housing. Film transport and registration apparatus attendant a camera for purposes of rotorscoping preclude interchanging a sliding mirror assembly useable with a rotary shutter and flip mirror assembly. Film boxes for cameras used particularly in making multiple exposure images generally include a pair of film boxes to house the unexposed and exposed film. These film boxes are generally not removable and remountable without meticulous attention to alignment of the drive mechanisms; often, threading the film from the film boxes into the camera is a difficult, time consuming and laborious process with danger of inadvertently exposing the film.

SUMMARY OF THE INVENTION

A sliding mirror mechanism permits reticle masking or rotorscoping, which mechanism is used in conjunction with a compact rotary or other shutter device. A reflex mirror shutter can be substituted for the rotary shutter and sliding mirror mechanism to perform both a shutter function and a rotorscoping function. Removable film boxes, whether used for unexposed or exposed film, are aligned with a camera by keying members for positioning accuracy and retained by simple pivotal levers, which minimize, cooperatively, the effort and difficulty in mounting or demounting the film boxes. A pivotally mounted motorized drive wheel rests upon each film reel shaft mounted wheel external to each film box to effect rotation of the reel.

A primary object of the present invention is to provide a reduced size camera suitable for reticle masking and having a pair of readily removable film boxes.

Another object of the present invention is to provide a sliding mirror mechanism for rotorscoping.

Still another object of the present invention is to provide a flip mirror shutter for superimposing masks and the like with a film strip to permit accurately aligned multi exposure images.

Yet another object of the present invention is to provide structure for rotorscoping in conjunction with a film registration assembly and remotely pivoted pressure plate.

A further object of the present invention is to provide a readily disengageable and reengagable transmission for transmitting power from a power source to the reel of a film box.

A still further object of the present invention is to provide apparatus for rotorscoping usable with a compact rotary disk shutter.

A yet further object of the present invention is to provide a method for repetitively registering masks and other images with a film strip.

A yet further object of the present invention is to provide a method for rotating a reel in a film box.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 7 illustrates a flip mirror shutter:

FIG. 8 is cross sectional view taken along lines 8—8, as shown in FIG. 7;

FIG. 9 is a cross sectional view taken along lines 9—9, as shown in FIG. 7;

DESCRIPTION OF THE PREFERRED EMBODIMENT

Figure 1:
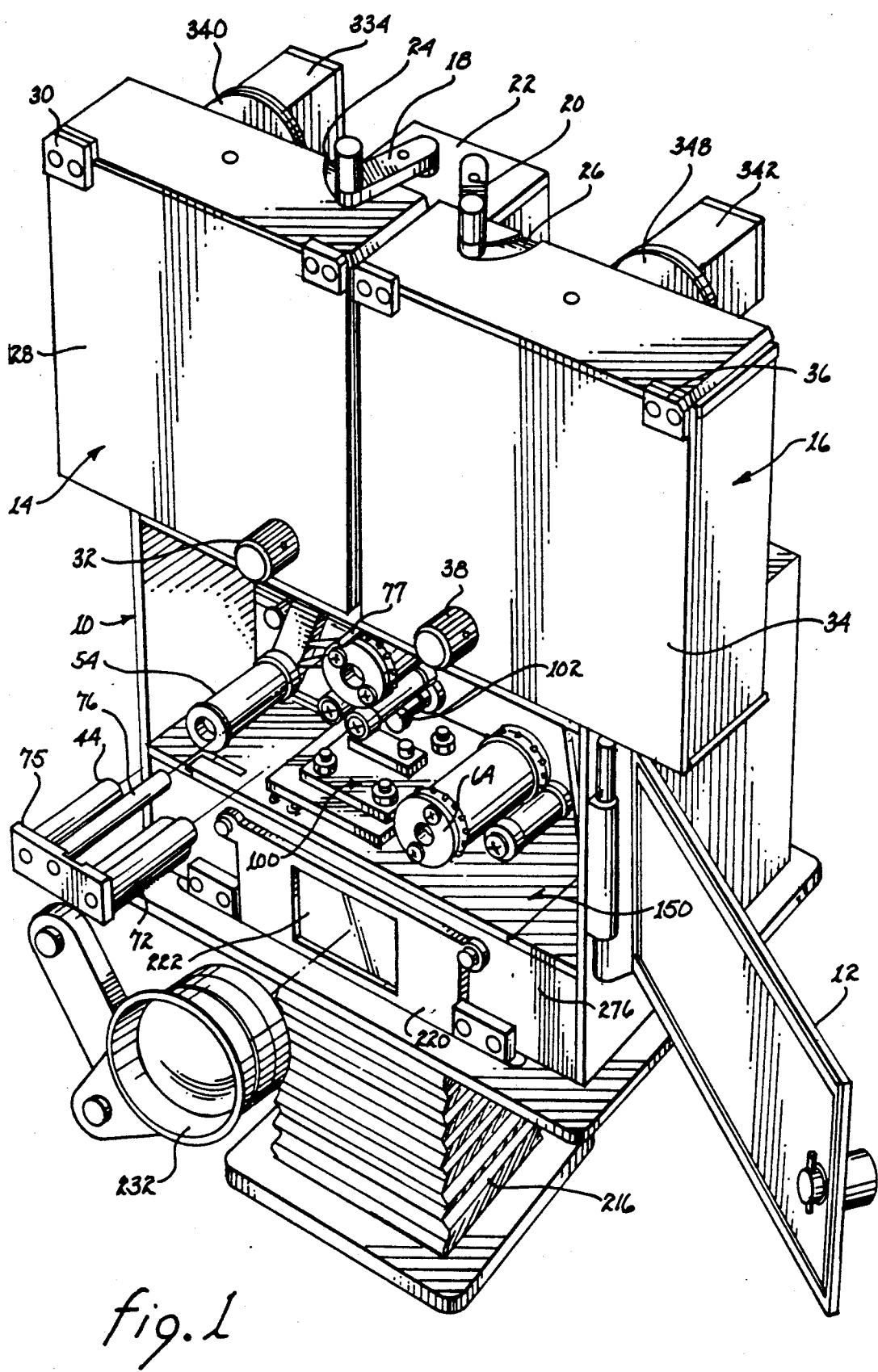
FIG. 1 is an isometric view of a camera having a film transport, registration and reticle masking mechanisms.

Referring to FIG. 1, there is shown a compartment 10 for housing the film transport an reticle masking (rotorscoping) mechanisms for a camera. The compartment includes a latchable door 12 for providing access to the film transport mechanism and to the film being transported. The door is made light tight upon closure by conventional well known means. A feed reel of unexposed film is contained within a film box 14. Similarly, film box 16 includes a film reel for taking up the exposed film. Each of the film boxes is removably positioned with respect to compartment 10 by means of interconnecting and position locating pins. Engagement with the pins is maintained by retaining levers 18,20 extending from bracket 22. Upon rotational movement of the levers, the feet of the levers engage ramps 24,26 of the respective film boxes to maintain them in positional engagement with the pins or other keying mechanisms intermediate the respective film box and compartment 10. Film box 14 includes a door 28 secured thereto via a hinges 30. A threaded knob 32 is engaged with a stud mounted within the film box to retain the door in place. Film box 16 includes a similar door 34, hinges 36 and knob 38. Each film box includes a shaft for supporting and retaining a film reel. A roller within each film box serves as a guide for the film between the film reel and a light tight slot (not shown) in the bottom of each film box. This slot cooperates with an aligned slot in the top of compartment 10 to provide passage for the respective lengths of film into or out of the compartment and the respective film box.

Figure 2:
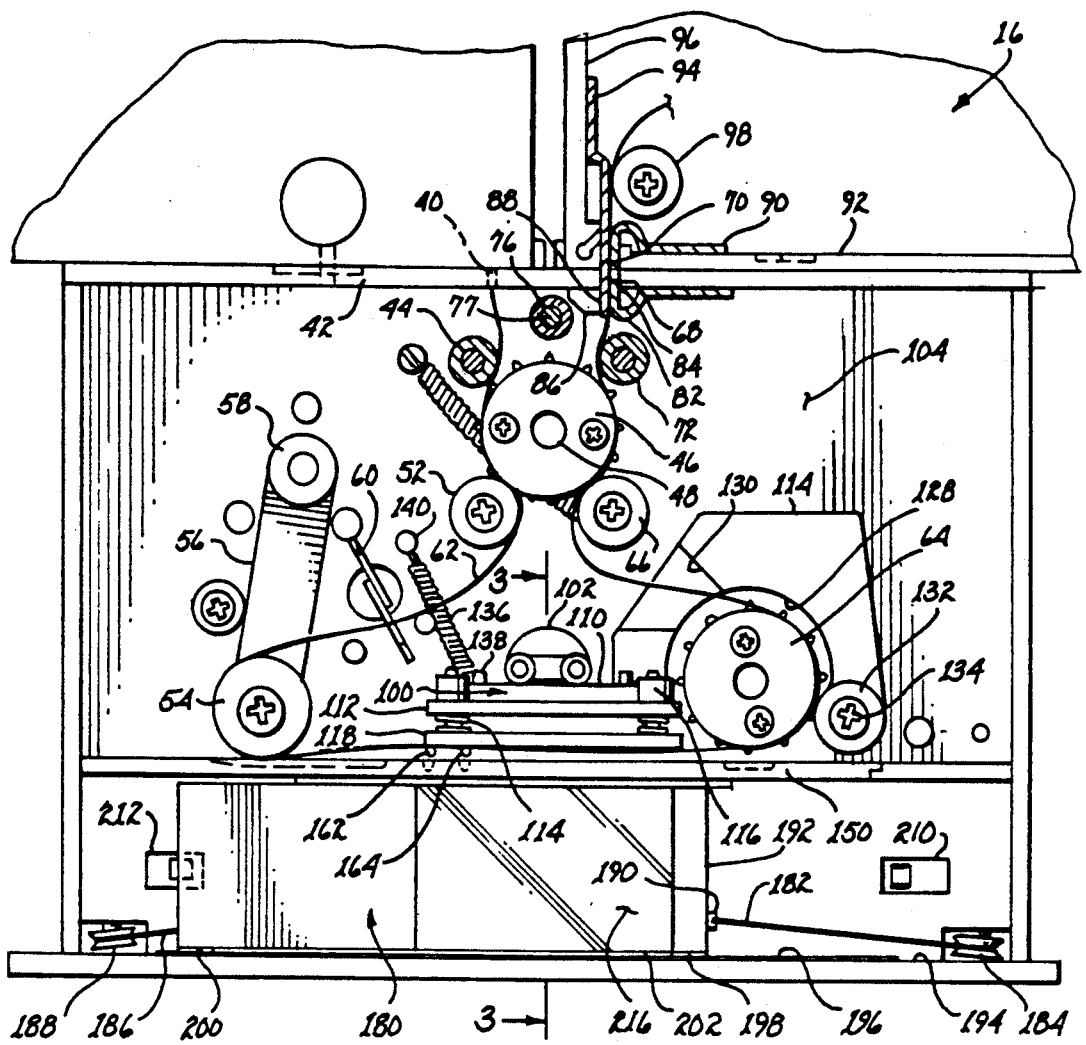
FIG. 2 is a front elevational view of the film transport mechanism and sliding mirror assembly.
Figure 10:
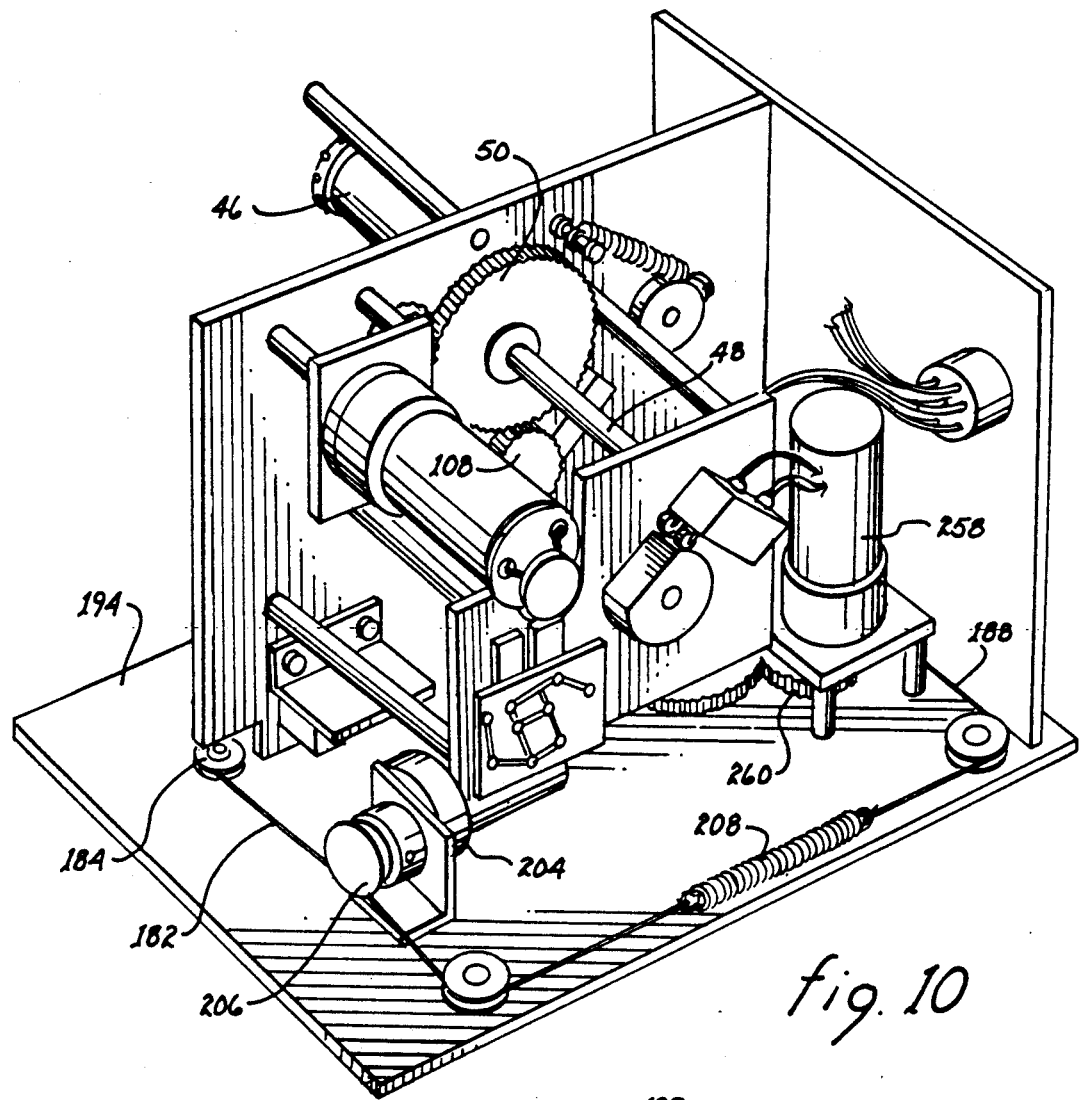
FIG. 10 is a partial view illustrating various drive mechanisms at the rear of the camera.
Figure 4:
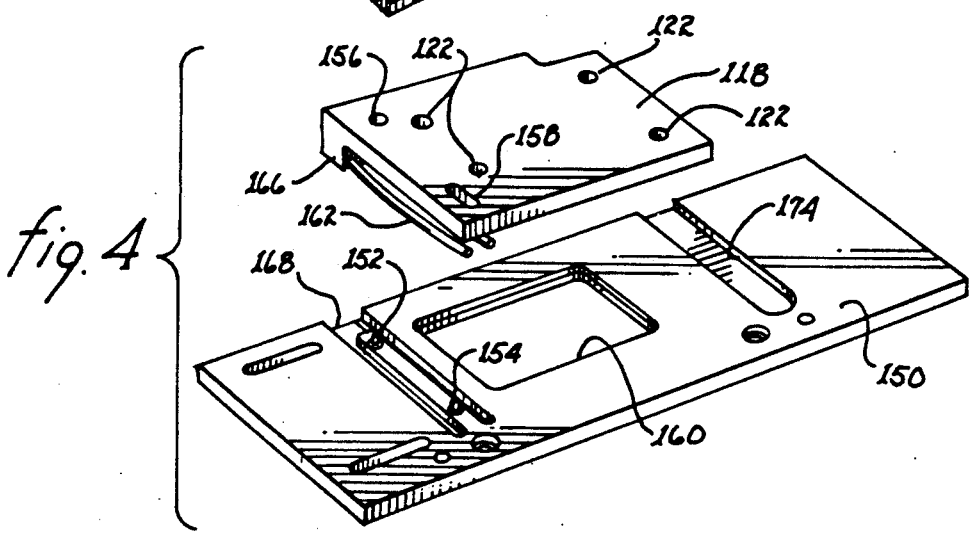
FIG. 4 is a partial isometric view showing the relationship between a pressure plate and an aperture plate.

Referring jointly to FIGS. 1 and 2, the film transport mechanism within compartment 10 will be described. Film from a film feed reel within film box 14 is threaded through a slot in the film box and a corresponding slot 40 in wall 42 of compartment 10. These slots are made light tight. The film is guided by a roller 44 and engages a drive sprocket 46 (mounted on shaft 48 and driven by gear 50, see FIG. 10) and then passes partially about a roller 52 to a pivotally mounted roller 54 to provide tension to the film strip. Roller 54 is mounted on arm 56 extending from boss 58 and may be positionally sensed by a miniature switch. A film cutting device 60 may be disposed to act upon the strip of film 62 intermediate rollers 52 and 58. From roller 54, the strip of film passes to sprocket 64. Roller 66 guides the film onto sprocket 46. From this sprocket, the film is guided by roller 72 through slot 68 in top wall 42 and corresponding slot 70 in film box 14 to the take up reel within the film box. Rollers 44,72 may be mounted upon shafts 73,74 extending from a bracket 75 (as shown in FIG. 1). A sleeve 76 extends from the bracket and is pivotally supported upon shaft 77. Thereby, the bracket and rollers 44,72 are free to pivot about shaft 77 in response to differing tensions of the film strip.

To preclude light exposure of a film strip upon withdrawal from the camera and insertion into film box 16, a length of material 80, such as felt, is adhered to the interior surface of wall 42 adjacent slot 68 and extends via a loop 82 into the slot for adhering contact with slot wall 84. A support 86 depends from wall 42 adjacent slot 68. A length of material 88, such as felt, is adhered to a vertical wall of support 86 and extends into slot 68 in adhering relationship to the slot wall. Support 86, in combination with wall 42, will serve in the manner of a guide to direct the end of a film strip into slot 68 intermediate the opposing materials. A length of material 90, such as felt, is adhered to surface 9 of film box 16. The material is looped upwardly therefrom and downwardly into slot 70. The penetrating portion of material 90 is adhered to the slot wall. A further length of material 94, such as felt, is adhered to the slot wall and extends upwardly therefrom into adhering contact with the surface of upright wall 96 of film box 16. The film box may include a roller 98 to guide the film strip from slot 70 onto the take up reel. The opposed lengths of material within slot 70 and within slot 68 preclude transmission of light therethrough and maintain the interior of the camera and the interior of the film box light tight. The slot in film box 14 and the corresponding slot in wall 42 include similar lengths of material to ensure that the slots are light tight.

Referring jointly to FIGS. 1, 2, 3 and 4, pressure plate assembly 100 will be described in further detail. A cam 102 extends from back wall 104 of compartment 10 and is mounted to permit rotation in response to drive means; note shaft 106 journaled in back wall 104 and rotatable through a gear 108. A Geneva mechanism (not shown) may be used to rotate shaft 106 and cam 102. A plurality of miniature switches (not shown) may be used to generate timing signals and position indicators. Cam 102 cooperates with an anvil 110 to bring about vertical displacement of the anvil in correspondence with rotation of the cam. The anvil is secured to a mounting plate 112, which mounting plate is rigidly secured to pivot arm 114 by one or more bolts 116. A pressure plate 118 depends from mounting plate 112 via studs 120, each of which studs threadedly engage one of apertures 122. A coil spring 124 is disposed about each stud and intermediate the pressure plate and the mounting plate to bias the pressure plate downwardly from the mounting plate and yet accommodate upward movement of the pressure plate by sliding movement of the shafts through the mounting plate. A collar 126 associated with each stud limits downward displacement of the stud in response to urging of coil springs 124.

Pivot arm 114 extends upwardly from mounting plate 112 and includes a cutaway position 128 to clear sprocket 64; additionally, the pivot arm includes an indentation 130 to clear film strip 62 traversing from sprocket 64 to roller 66. A sleeve 132 extends from the end of the pivot arm for pivotal engagement with a shaft 134 extending from rear wall 104. Means are employed to retain the sleeve on the shaft. A coil spring 136 is secured to mounting plate 112 by a stud 138 or the like and to rear Wall 104 by a further stud 140 or the like. The coil spring biases pressure plate assembly 100 upwardly and urges ongoing contact between cam 102 and anvil 110.

A plurality of channels 142 extend transversely across the pressure plate in alignment with the direction of travel of a strip of film disposed therebeneath. These channels permit dispersal of air intermediate the strip of film and the pressure plate, which air might otherwise serve in the manner of a cushion and preclude full downward travel of the pressure plate. It has been learned that channels in the pressure plate provide substantially better results in dissipating the air than holes in the pressure plate.

Registration of the film strip with aperture plate assembly 150 is assured through the use of two registration pins 152,154. Apertures 156,158 within pressure plate 118 positionally correspond with the registration pins to permit penetration thereinto of the registration pins. Aperture 160 within aperture plate assembly 150 defines the size of the picture frame and corresponding segment of film to be exposed, assuming that a mask or the like is not employed. Since registration of the film is of critical importance only with respect to the area defined by aperture 160, pins 152,154 are located laterally adjacent the aperture and in alignment with the sprocket holes in film strip 62. One standard size of sprocket holes is 0.110 inches in length by 0.078 inches in width. To align the film strip in the direction of travel, it is important to ensure that there is not even slight angular misalignment. Such alignment is achieved by registration pins 152 and 154. Pin 152 is exactly 0.110 inches long and 0.078 inches wide to ensure an exact fit with each penetrated sprocket hole and prevent both lateral and longitudinal movement of the film strip. Pin 154 is exactly 0.078 inches wide to ensure exact fit with the opposed short sides of each sprocket hole; thus, it prevents lateral movement of the film strip. The above measurements are for Kodak film perforation; for Bell and Howell film perforation, the dimensions would be 0.110 and 0.073 inches.

To assist in penetrable engagement of each registration pin with the respective sprocket hole, the registration pins may have their top surface sloped or beveled along an axis transverse to the direction of travel of the film strip to facilitate penetration with a sprocket hole. By use of these two pins wherein one pin positions the film strip in one axis only and the other pin positions the film strip in both axes, very precise positioning of the film strip may be accomplished. Such exactness in positioning is of great importance in order to achieve exact and precise positioning of any masks or overlays used in conjunction with the formation of an image.

To assist in disengaging the film strip from registration pins 152,154 during transport of the film, support arms 162,164 are employed beneath pressure plate 118. A flange 166 depends from the rear edge of pressure plate 118. The pair of support arms are secured to the flange and extend forwardly therefrom to approximately the front edge of the pressure plate. Each of these support arms may have its center section slightly bowed downwardly; alternatively, the thickness of the center section may be reduced along the top surface. With such bowing or reduction in thickness at the center section, contact with a supported film strip will be primarily along the opposed edges of the film strip at or outwardly from the sprocket holes. Thereby, scratches in the image area will be avoided by precluding contact between the image area and the support arms. Aperture plate assembly 150 includes an indentation 168 for receiving flange 166. Further, the aperture plate assembly includes a pair of channels 170,172 for receiving support arms 162,164, respectively, when the pressure plate is in its downward most position. Under certain circumstances it may be preferable to locate support arms 162,164 adjacent the other parallel edge of pressure plate 118; to accommodate such support arms, the aperture plate may include a pair of channels or an indentation 174.

Mounting of film strip 62 can be readily made from the front of compartment 10 by simply sliding horizontally and inwardly the film strip between support arms 162,164 and pressure plate 118. Such sliding movement requires a minimum of skill and manual dexterity. During advance of film strip 62, pressure plate assembly 100 is raised in response to the force exerted by spring 136 when cam 102 is in the position depicted in FIG. 2. The commensurate rise of pressure plate 108 will lift film strip 62 upwardly out of registration with pins 152,154 due to the supporting or cradling function performed by support arms 162,164. Upon advance of the film, the support for the film received from the support arms is proVided along the lateral edges of the film and contact between the image area of the film with the center section of the support arms is precluded as a result of the bowing or downwardly curved center section of each of the support arms.

As particularly illustrated in FIGS. 2, 3, 5 and 10, a sliding mirror mechanism 180 may be employed to effect reticle masking (rotorscoping). Transport of the mirror mechanism is provided through cable 182 supported by canted pulley 184 and cable 186 supported by canted pulley 188. A point of attachment 190 on side 192 of mirror mechanism 180 is located above the bottom of the mirror mechanism and forwardly of the rear side. Pulley 184 is located in general vertical alignment with rear wall 104. Accordingly, cable 182 will exert a bias upon mirror mechanism 180 to maintain the mirror mechanism against rear wall 104 and against bottom plate 194. Cable 186 is similarly attached to mirror mechanism 180; it also tends to bias the mirror mechanism toward the rear wall and the bottom plate. To minimize drag and promote smooth movement of the mirror mechanism, a low friction material may be disposed between the mirror mechanism and the rear wall and between the mirror mechanism and the bottom surface. For example, bottom plate 194 may be covered with a sheet of low friction material 196 sold under the trademark Teflon. Strips 198,200 of this material may be attached to opposed ends of bottom surface 202 of mirror mechanism 180. A similar sheet of material may be attached to rear wall 104 with strips of such material attached to the rear sides of the mirror mechanism. An electric motor 204, supporting a drum 206 having cable 182 wrapped therearound, draws cables 182,186 in each direction in response to actuation of the motor. A tension spring 208 maintains the cables in tension and assures grip of the cable about the drum. Limit switches, such as miniature switches 210 and 212 responsive to repositioning of the sliding mirror mechanism may be employed.

Bottom plate 194 of compartment 10 includes an aperture 202 cooperating with a bellows 216 (see FIG. 1) and lens apparatus (not shown). Mirror mechanism 180 (as particularly shown in FIGS. 2, 3 and 5) includes a fixed mirror 216 to permit viewing a superimposed image. A film strip containing the image to be superimposed may be placed adjacent window 218 and retained in place by door 220, which door includes a transparent or frosted glass element 222. Registration is effected by pins 224,226 corresponding with pins 152,154. Such superimposition of an image can be viewed when the mirror mechanism is in the position depicted in FIG. 2. To project an image upon film strip 62, mirror mechanism 180 is transported to the right (partial transport being shown in FIG. 5) to draw mirror 216 out of the way and permit the left half 228 of the mirror mechanism to come into alignment with aperture 214 in bottom plate 194 and a segment of the film strip retained in place upon aperture plate assembly 150 by pressure plate assembly 100. Left half 228 of the mirror mechanism includes a passageway 230 extending therethrough commensurate in size with aperture 214 and the size of the image to be formed in film strip 62.

Figure 3:
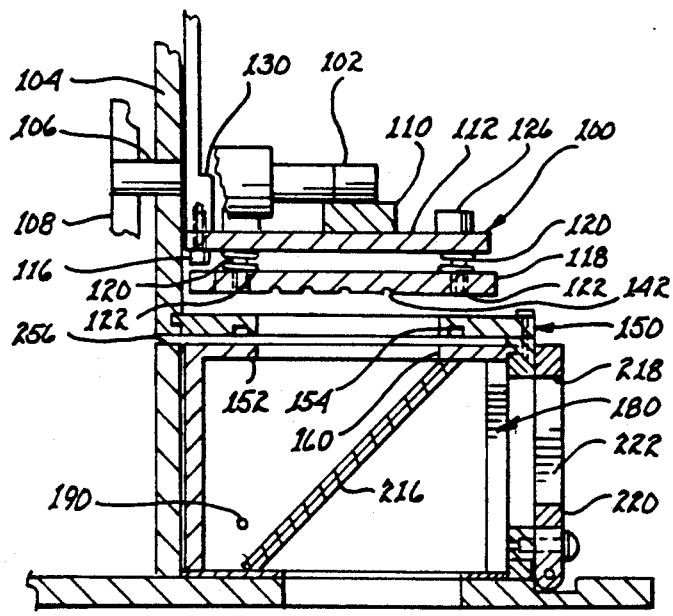
FIG. 3 illustrates a cross sectional view taken along lines 3—3, as shown in FIG. 2.
Figure 5:
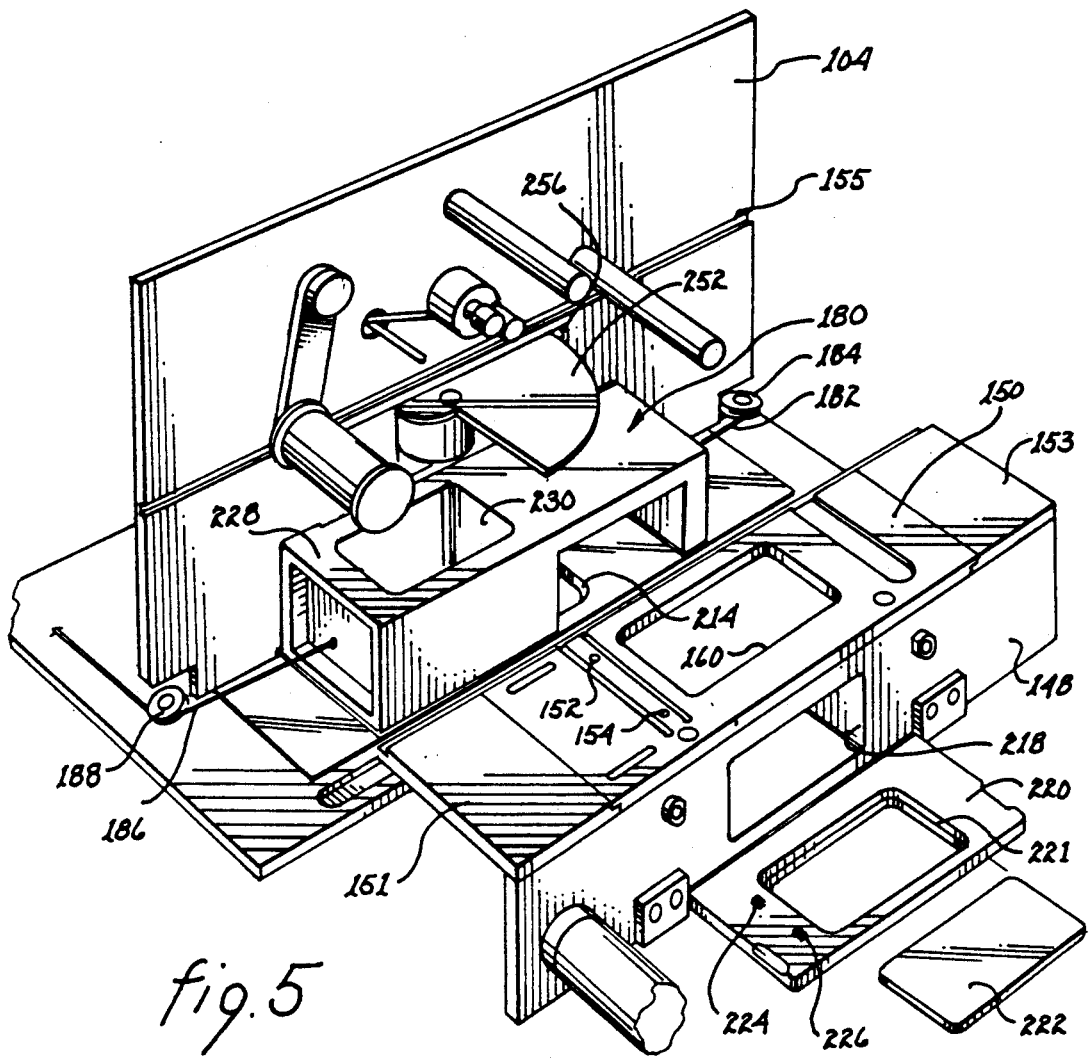
FIG. 5 is an isometric view of the sliding mirror mechanism and mask registration apparatus.

Referring to FIGS. 3 and 5, further details attendant and superimposition of a mask or other overlay will be described. Aperture plate assembly 150 includes lateral extensions 151,153 joined by overlapping edge segments to form a light tight junction. The aperture plate assembly and the extensions fit within a groove 155 disposed in back wall 104 to form a light tight junction. A front wall 148 extends downwardly from a light tight junction with the front edge of aperture plate assembly 150 and extensions 151,153. The front wall forms a light tight fit with bottom plate 194. This front wall includes a window 218 through which an image is to be transmitted. A door 220, having an aperture 221, is pivotally attached to front wall 148 to permit juxtapositioning of aperture 221 with window 218. Aperture 221 is configured to nestingly receive a section of frosted or transparent glass 222. A pair of registration pins 224,226 extend from the door to receivingly engage the sprocket holes of a mask, grid overlay or the like to be placed adjacent the glass. Registration pins 224 and 226 correspond in size and function with registration pins 152 and 154, respectively. Accordingly, the positioning accuracy and registrability of an overlay placed adjacent door 220 will have the same accuracy as a film strip placed upon the aperture plate assembly.

Figure 6:
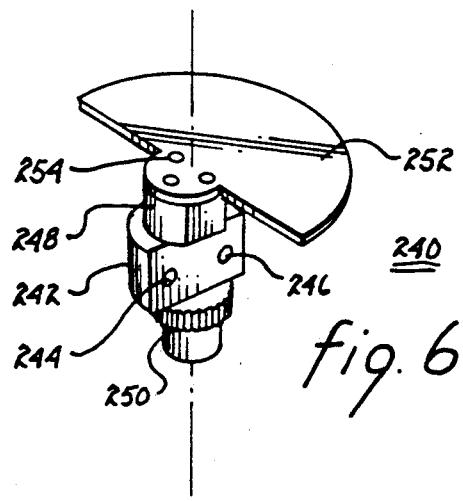
FIG. 6 illustrates a compact rotary shutter.

Referring jointly to FIGS. 3, 5 and 6, there is illustrated a rotary shutter 240. The shutter is mounted rearwardly of and against back wall 104 by journal 242 and is secured thereto by a pair of bolts penetrably engaging apertures 244,246 in the journal and threaded apertures in the sidewall. A shaft rotatably mounted in journal 242 extends from opposed ends thereof to non rotatably engage each of boss 248 and gear 250. A disc segment 252, illustrated as semi-circular, is secured to the upper surface of boss 248 by a plurality of bolts 254 and extends through slot 256 in back wall 104 below groove 155. This disk segment extends beneath aperture 160 in aperture plate assembly 150 and above sliding mirror mechanism 180. The shutter regulates the light impinging upon the film strip mounted upon the aperture plate assembly. The drive mechanism for shutter 240 includes a drive motor 258 having an output gear 260. The output gear engages gear 250 of the shutter via a further gear 262 (see FIG. 10).

Referring jointly to FIGS. 1, 7, 8 and 9, a variant form of the shutter and the mirror will be described. A fixed mirror assembly 270 is fixedly disposed beneath aperture plate assembly 150. A top plate 272 includes an aperture 274 coincident with aperture 160 of the aperture plate assembly. A ridge 280 extends about aperture 274 and nestingly mates with a groove 282 formed in aperture plate assembly 150 to provide a light tight fit about the perimeter of the aperture. Bolt means, such as bolts 284, may penetrably engage the aperture plate assembly for threaded engagement with front plate 276, as shown, and with top plate 272. A mirror 286 is pivotally supported upon pivot means 288 disposed proximate the front of top plate 272 A stop 290 limits the rearward excursion of mirror 286 and forms a light tight seal therebetween. Additionally, a pair of opposed plates or increased thickness sides, of which side 292 is shown in FIGS. 7 and 8, include shoulders, such as shoulder 294, bearing against mirror 286 to form a light tight fit therebetween. Pivot means 288, in combination with the structure supporting ridge 280, forms a light tight fit. In the position of mirror 286 as shown in FIG. 8, a film strip placed upon aperture plate assembly 150 will not be exposed by any light transmitted around mirror 286 within fixed mirror assembly 270. A motor 296 is selectively actuated to pivot arm 298, which arm includes a slot 300. A further arm 302, fixedly connected with mirror 286, includes a pin 304, which pin is disposed in slot 300. Upon pivotal movement of arm 298, pin 304 will be translated within slot 300 and result in pivotal movement of mirror 286. Accordingly, mirror 286 serves in the manner of a shutter to expose, upon energization of motor 296, an image in a film strip placed upon aperture plate assembly 150. As described above with respect to the sliding mirror mechanism, front plate 276 includes a window 278 (like window 218). A door 220 may be mounted upon front plate 176 to permit selective use of masks and the like.

A lens (not shown) is secured to bellows 216, shown in FIG. 1, to project an image through either sliding mirror mechanism 180 or fixed mirror assembly 270. The projected image corresponds with aperture 160 of the aperture plate assembly. To permit viewing of the image to be recorded on film, the respective mirror reflects the image from the subject being photographed onto frosted glass 222 in door 220 when the door is closed. To assist the viewer, a magnifying lens 232 (see FIG. 1) may be pivotally attached to a sidewall or support member of the camera 10. In the event an overlay having a mask, grid, etc. formed therein is placed upon the registration pins of the door, the projected image will be superimposed by the contents of such mask, grid, etc. to permit a photographer to confirm the accuracy and correctness of the image to be photographed. During exposure of a film strip placed upon the aperture plate assembly, the sliding mirror assembly is translated laterally and the rotary shutter is energized or the mirror of the fixed mirror assembly is pivotally relocated downwardly and forwardly to serve as a shutter and permit transmission of the image.

Figure 11:
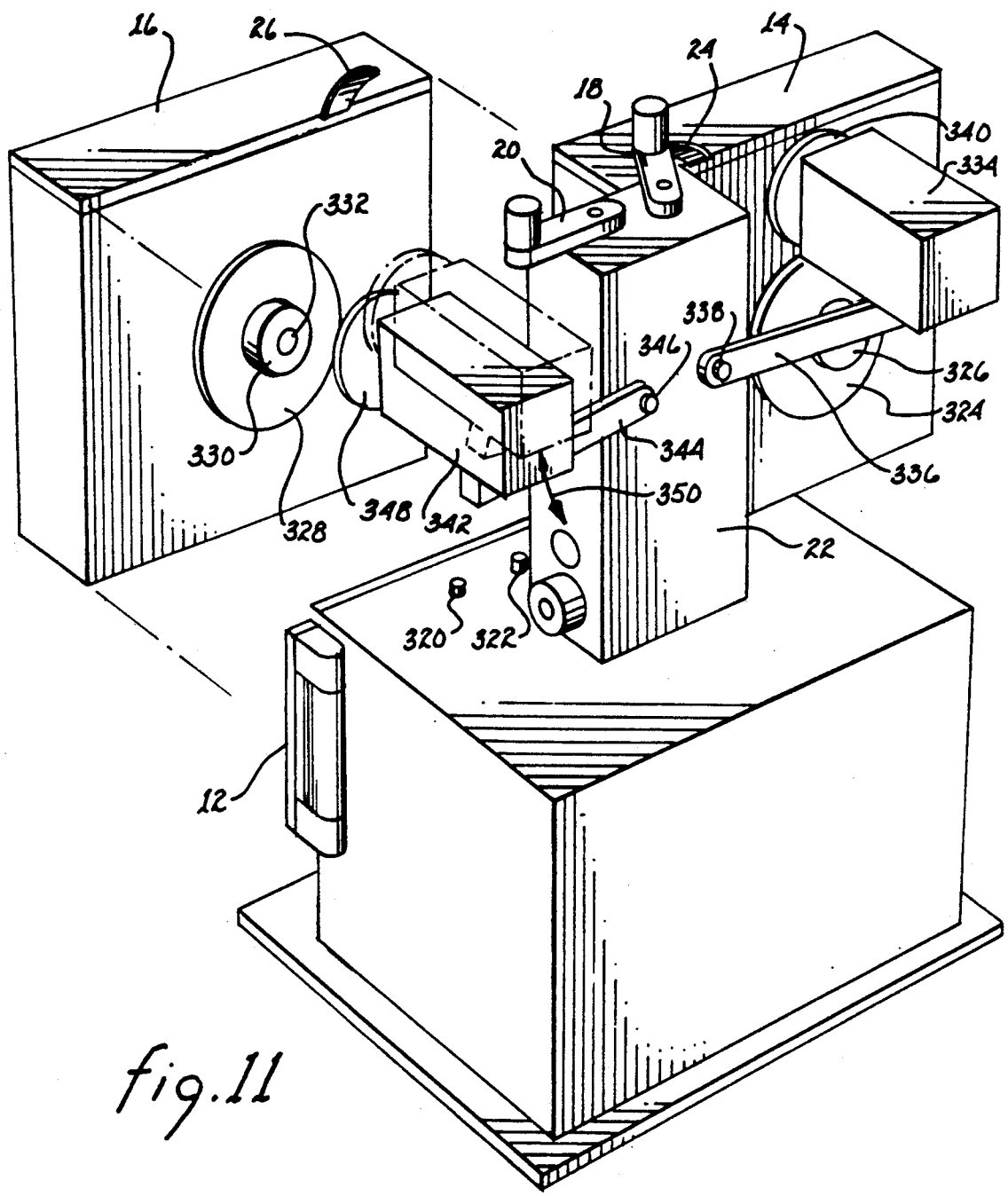
FIG. 11 is an isometric view of the drive mechanism for the film boxes.

Referring jointly to FIGS. 1, 2 and 11, certain features attendant film boxes 14 and 16 will be described in further detail. Registration of the film boxes upon top wall 42 may be effected by pins 320,322 extending upwardly therefrom. These pins penetrably engage correspondingly located cavities in the bottom of the respective film box. Thus, film transport between compartment 10 and each of the film boxes through the respective slots (such as slots 40,68) is assured and repetitively achievable. Retention of each of the film boxes in its proper and precisely located location is assured by levers 18,20 frictionally engaging ramps 24,26. More particularly, bracket 22, which may be in the manner of a box, pivotally supports levers 18 and 20 to retain film boxes 14,16 in place. Film box 14 includes a wheel 324 mounted upon a journal 326, which journal is attached to a shaft supporting the film reel within film box 14. Upon rotation of wheel 324, the attached reel will rotate correspondingly. A similar wheel 328 attached to journal 330 is mounted upon a shaft 332 corresponding with the shaft supporting the take up reel in film box 16. Rotation of wheel 328 will result in commensurate rotation of the film take up reel. A motor unit 334 is supported by a lever 336 pivotally secured to bracket 22 by pivot means 338. The output of motor unit 334 includes a drive wheel 340 having a high friction perimeter. Upon downward pivotal positioning of motor unit 334, drive wheel 340 will rest upon wheel 324. Rotation of drive wheel 340 will be translated to commensurate rotation of wheel 324 and the attached film reel within film box 14. Since the engagement between the driving and the driven wheels is friction based, the degree of friction therebetween can be controlled and regulated to prevent damage to the film and any film transport mechanisms that may be malfunctioning. The degree of friction imposed is a function of the weight of motor unit 334 and the effective lever arm of such weight in combination with the degree of friction between the driving and the driven wheels. A similar motor unit 342 associated with film box 16 is attached to lever 344, which lever is pivotally secured to bracket 22 by pivot means 346. A drive wheel 348 also includes a high friction perimeter for engaging the perimeter of wheel 328. As depicted by the dashed lines and arrow 350, motor unit 342 is pivotable into and out of engagement with wheel 328 in the same manner as motor unit 334.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirement without departing from those principles.

I claim:

1. Apparatus for reticle masking a film strip in a camera, which camera includes a film transport mechanism disposed in a compartment having a rear wall and a bottom plate, said apparatus comprising in combination:

a) an aperture plate assembly for locating a film strip in predetermined registration;
b) mask retention means for retaining in registration with the film strip an image to be superimposed;
c) a sliding mirror mechanism having a first position for superimposing the image and a second position for exposing the film strip;
d) means for translating said sliding mirror mechanism from the first position to the second position and return; and
e) means for biasing said sliding mirror mechanism against both the rear wall and the bottom plate of the camera in each of the first and second positions and during transport of said sliding mirror mechanism between the first and second positions.

2. The apparatus as set forth in claim 1 wherein said sliding mirror mechanism includes a first section having a mirror for reflecting the image to be superimposed upon the image to be photographed and a second section having a passageway for transmitting light from the image to be photographed to the film strip.

3. The apparatus as set forth in claim 2 wherein said translating means includes a cable drive and motive means for operating said cable drive.

4. The apparatus as set forth in claim 3 wherein said sliding mirror mechanism includes means for attaching first and second cables of said cable drive to opposed ends, respectively, of said sliding mirror mechanism at locations forwardly of the rear wall and upwardly above the bottom plate of the camera.

5. The apparatus as set forth in claim 4 including a first pulley in general vertical alignment with the rear wall for drawing said first cable downwardly and rearwardly in response to operation of said motive means and a second pulley in general vertical alignment with the rear wall for drawing said second cable downwardly and rearwardly in response to operation of said motive means.

6. The apparatus as set forth in claim 5 including means disposed between said sliding mechanism and each of the rear wall and the bottom plate for reducing friction therebetween during translation of said sliding mirror mechanism.

7. The apparatus as set forth in claim 2 including a rotary shutter mounted upon the rear wall, said shutter including a partial disk rotatable intermediate said sliding mirror mechanism and said aperture plate assembly for regulating the exposure of the film strip to light passing through said passageway of said sliding mirror mechanism.

8. The apparatus as set forth in claim 7 wherein said rotary shutter is mounted on the rear side of the rear wall and including a slot formed in the rear wall for accommodating penetration of said disk through the rear wall.

9. The apparatus as set forth in claim 1 wherein said mask retention means depends downwardly from said aperture plate assembly to the bottom plate.

10. The apparatus a set forth in claim 9 wherein said mask retention means includes a door for retaining the image to be superimposed and in registration with the film strip.

11. Apparatus for reticle masking a film strip in a camera, which camera includes a film transport mechanism disposed in a compartment having a rear wall and a bottom plate, said apparatus comprising in combination:

a) an aperture plate assembly for locating a film strip in predetermined registration;
b) mask retention means for retaining in registration with the film strip an image to be superimposed;
c) a flip mirror mechanism having a mirror positionable in a first position for superimposing the image and a second position for exposing the film strip of said flip mirror mechanism including a passageway extending therethrough and means for pivotally locating said mirror within said passageway;
d) means disposed about one end of said passageway for establishing a light tight seal between said aperture plate assembly and said flip mirror mechanism; and
e) means for selectively pivoting said mirror from the first position to the second position and return.

12. The apparatus as set forth in claim 11 wherein said flip mirror mechanism includes a window for transmitting the image to be transposed from said mask retention means to said mirror.

13. The apparatus as set forth in claim 12 wherein said mask retention means depends downwardly from said aperture plate assembly to the bottom plate.

14. The apparatus as set forth in claim 13 wherein said mask retention means is juxtaposed with said window.

15. The apparatus a set forth in claim 14 wherein said mask retention means includes a pivotally attached door adjacent said window, an aperture disposed in said door and means for retaining the image to be superimposed adjacent said aperture.

16. The apparatus as set forth in claim 11 including means disposed within said passageway for establishing a light tight seal between said mirror and the surfaces of said passageway when said mirror is in the first position.

17. The apparatus as set forth in claim 11 wherein said translating means includes pivot means for pivotally mounting said mirror within said passageway.

18. The apparatus as set forth in claim 17 including motive means for pivoting said mirror from the first position to the second position and return.

19. The apparatus as set forth in claim 18 including a linkage for interconnecting motive means with said mirror.

20. Apparatus for rotating a film reel in a film box attached to a camera, said apparatus comprising in combination:

a) key means for aligning the film box with the camera;
b) a driven wheel extending from said film box, said driven wheel being operatively engaged with a shaft supporting the film reel;
c) motive means for rotating said driven wheel, said motive means including a drive wheel for engaging said driven wheel;
d) lever means for supporting said motive means;
e) pivot means for pivotally receiving said lever means to provide a friction force between said driven wheel and said drive wheel as a function of the weight of said motive means and the moment arm of said lever means.

21. The apparatus as set forth in claim 20 including a bracket extending from the camera and wherein said pivot means is attached to said bracket.

22. The apparatus as set forth in claim 21 wherein said lever means comprises an apertured lever and wherein said pivot means comprises a means extending through the aperture of said lever to said bracket for pivotally supporting said lever.

23. The apparatus as set forth in claim 20 wherein said driven wheel and said drive wheel are in a common plane.

24. The apparatus as set forth in claim 20 wherein the perimeter of said drive wheel engages the perimeter of said driven wheel.

25. The apparatus as set forth in claim 20 wherein said motive means includes an electric motor and an output shaft for supporting said drive wheel.

26. The apparatus as set forth in claim 20 wherein said driven wheel is mounted on a shaft supporting the reel.

27. The apparatus as set forth in claim 20 wherein said key means includes at least one pin extending from the camera into penetrable engagement with the film box.

28. The apparatus as set forth in claim 27 including a pivotally attached arm for maintaining engagement between said pin and the film box.

29. The apparatus as set forth in claim 28 wherein the film box includes a ramp for receiving said arm.

30. The apparatus as set forth in claim 20 wherein said pivot means includes means for pivoting said motive means to disengage said drive wheel from said driven wheel.

* * * * *